United States Patent
Park

(10) Patent No.: US 11,623,687 B2
(45) Date of Patent: Apr. 11, 2023

(54) TRAVELING MODE SWITCHING MECHANISM OF FOUR-WHEEL INDEPENDENT STEERING TYPE VEHICLE

(71) Applicants: Hyundai Motor Company, Seoul (KR); Kia Motors Corporation, Seoul (KR)

(72) Inventor: Jeong Hwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 403 days.

(21) Appl. No.: 16/917,281

(22) Filed: Jun. 30, 2020

(65) Prior Publication Data
US 2021/0291898 A1    Sep. 23, 2021

(30) Foreign Application Priority Data
Mar. 17, 2020  (KR) .......................... 10-2020-0032710

(51) Int. Cl.
*B62D 7/14*    (2006.01)
*B62D 7/15*    (2006.01)
*B62D 6/00*    (2006.01)

(52) U.S. Cl.
CPC ............. *B62D 6/007* (2013.01); *B62D 7/148* (2013.01); *B62D 7/159* (2013.01)

(58) Field of Classification Search
None
See application file for complete search history.

(56) References Cited

U.S. PATENT DOCUMENTS

| | | | | |
|---|---|---|---|---|
| 5,609,220 A * | 3/1997 | Moriya | ............... | B62D 15/00 180/443 |
| 6,151,977 A * | 11/2000 | Menig | ................ | B60K 20/06 74/473.18 |
| 6,481,524 B1 * | 11/2002 | Ishida | ................ | B62D 15/02 180/252 |
| 2004/0226801 A1 * | 11/2004 | De Jonge | ........... | F16H 59/0204 192/220.7 |
| 2008/0290622 A1 * | 11/2008 | Okada | ............... | B62D 7/1509 280/99 |
| 2014/0130630 A1 * | 5/2014 | Kim | .................. | F16H 59/105 74/473.12 |

(Continued)

FOREIGN PATENT DOCUMENTS

JP    2001071780 A  *  3/2001  .......... B60K 31/042
KR    10-0178945       3/1999

*Primary Examiner* — Daniel L Greene
(74) *Attorney, Agent, or Firm* — Fox Rothschild LLP

(57) ABSTRACT

A technology of mechanically classifying a switching operation between a traveling mode and a special moving mode is provided to prevent a mode switching misoperation. A traveling mode switching mechanism of a four-wheel independent steering type vehicle includes a shift gate which is disposed by forming a moving path of a shift lever, and grouping a traveling mode and a special moving mode. Additionally, a mode switching differentiation devices differentiates a mode switching operation of a driver by configuring so that an operation of the shift lever switched between the traveling mode and the special moving mode is physically different from an operation of the shift lever switched between the traveling modes or between the special moving modes.

14 Claims, 13 Drawing Sheets

(56) References Cited

U.S. PATENT DOCUMENTS

| | | | | |
|---|---|---|---|---|
| 2014/0305715 A1* | 10/2014 | Makino | ................ | B60K 17/358 180/6.24 |
| 2015/0167823 A1* | 6/2015 | Min | ....................... | F16H 59/08 74/473.3 |
| 2017/0370467 A1* | 12/2017 | Uejima | .................. | F16H 61/18 |

* cited by examiner

TRAVELING MODE SWITCHING MECHANISM OF FOUR-WHEEL INDEPENDENT STEERING TYPE VEHICLE

CROSS REFERENCE TO RELATED APPLICATION

The present application claims priority of Korean Patent Application No. 10-2020-0032710 filed on Mar. 17, 2020, the entire contents of which is incorporated herein for all purposes by this reference.

BACKGROUND

Field of the Disclosure

The present disclosure relates to a traveling mode switching mechanism of a four-wheel independent steering type vehicle, which mechanically classifies a switching operation between a normal traveling mode and a special moving mode to prevent misoperation due to a driver error, by providing a user-friendly interface even while simplifying a traveling mode switching operation.

Description of the Related Art

An existing vehicle wheel may be steered in only two modes (e.g., straight, left/right turn), thereby being intuitively driven using a fewer operation system. On the other hand, a 4-wheel independent steering system (4WS) may control each wheel independently, thereby making it possible to make various behaviors of the vehicle.

Referring to FIGS. 1A and 1B of the related art, in normal front wheel and rear wheel traveling modes, a wheel rotates as many rotations as a steering wheel is rotated, and accelerates as an accelerator pedal is depressed or engaged, thereby rotating while driving the vehicle forward. At this time, whether the reverse steering of a rear wheel with respect to the front wheel may be determined based on a vehicle speed, a steering angle, or the like, thereby helping to reduce a U-turn turning radius.

Further, in a diagonal moving mode as illustrated in FIG. 1C of the relate art, the rear wheel is controlled in phase with respect to the front wheel, and thus, no yaw is generated in the vehicle. This is advantageous when changing lanes or overtaking a preceding vehicle. Additionally, in a parallel moving mode as illustrated in FIG. 1D of the related art, the front wheel and the rear wheel may be rotated by 90 degrees, thereby being advantageous in parallel parking. In an in place rotating mode as illustrated in FIG. 1E of the related, the front wheel and the rear wheel may be rotated by 45 degrees, to perform the U-turn of the vehicle in an alleyway or the like.

Meanwhile, although the development of a 4WS related hardware is concentrated recently, a control concept and a user interface for operating the 4WS are required be developed to realize and mass-produce the 4WS. Most of the 4WS operation methods currently developed use a joystick or a controller, select a mode with a button or a touch pad, and move the joystick to control a direction and a speed. However, the existing 4WS operation method has the following problems.

First, in the case of the joystick, the maximum operating angle is about 50 degrees, and assuming that the wheel steering angle of the 4WS is 150 degrees (e.g., −60 degrees to +90 degrees), the wheel rotates by 3 degrees with only the 1 degrees rotation of the joystick, such that a total gear ratio (TGR) becomes about 0.33. Accordingly, considering that the TGR of the current vehicle is about 15 to 20, the joystick type of TGR 0.33 has a problem of reacting sensitively and thus, the operation may be impossible.

Further, a complex operation system is required to control various 4WS modes, and many buttons, levers, and pedals may be required, thereby complicating the operation. When the mode is switched using the touch pad or the button, the mode switching operation is impossible during operation of the vehicle for safety reasons, and may be limitedly used only at low speed or in a vehicle stopped state, which has a disadvantage of not using the advantages of the 4WS properly. The joystick or controller type has a problem in that the operation direction and the vehicle behavior do not match, thereby making it difficult for the driver to intuitively operate the vehicle.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a traveling mode switching mechanism of a four-wheel independent steering type vehicle, which mechanically classifies a switching operation between a normal traveling mode and a special moving mode to prevent misoperation due to a driver error mistake.

A configuration of the present disclosure for achieving the object may include a shift gate disposed by forming a moving path of a shift lever, grouping a traveling mode that includes a park (P)-stage mode, a drive (D)-stage mode, and a reverse (R)-stage mode, and grouping a special moving mode excluding the P-stage mode, the D-stage mode, and the R-stage mode; and a mode switching differentiation device configured to differentiate a mode switching operation of a driver and an operation of the shift lever switched between the traveling mode and the special moving mode is physically different from an operation of the shift lever switched between the traveling modes or between the special moving modes.

The mode switching differentiation device may be configured so that an operation stroke of the shift lever switched between the traveling mode and the special moving mode is longer than an operation stroke of the shift lever switched between the traveling modes or between the special moving modes. Additionally, the mode switching differentiation device may be configured with an operation direction of the shift lever switched between the traveling mode and the special moving mode being different from an operation direction of the shift lever switched between the traveling modes or between the special moving modes.

The moving path of the shift lever switched between the traveling mode and the special moving mode may be formed by sequentially connecting a front-rear moving path and a left-right moving path of the shift lever. The front end of a first front-rear moving path may be connected to the traveling mode, directly connected to the special moving mode, the rear end of a second front-rear moving path may be connected to the special moving mode, directly connected to the traveling mode, and both ends of the left-right moving path may be connected between the rear end of the first front-rear moving path and the front end of the second front-rear moving path.

The front end of the front-rear moving path may be connected to the traveling mode, directly connected to the special moving mode, a first side end of the left-right moving path may be connected to the special moving mode, directly connected to the traveling mode, and a second side end of the left-right moving path may be connected to the rear end of the front-rear moving path. The special moving mode may be disposed individually on the moving path of the shift lever.

The special moving mode may include a diagonal moving mode, a parallel moving mode, and an in place rotating mode, and the D-stage mode may be directly connected to the R-stage mode and the diagonal moving mode, respectively, the diagonal moving mode may be directly connected to the parallel moving mode, and the parallel moving mode may be directly connected to the in place rotating mode. Additionally, the special moving mode may include a diagonal moving mode, a parallel moving mode, and an in place rotating mode, and the R-stage mode may be directly connected to the D-stage mode, and the R-stage mode may be directly connected to the diagonal moving mode, the parallel moving mode, and the in place rotating mode in a branched form.

A diagonal R-stage mode may be directly connected to the diagonal moving mode. A first side end of the left-right moving path may be connected to the traveling mode, a second side end of the left-right moving path may be connected to the middle end of the front-rear moving path, and the front end and the rear end of the front-rear moving path may be connected to a special moving selection mode capable of selecting the special moving mode.

The special moving selection mode may include a (+) mode and a (−) mode, and whenever the (+) mode or the (−) mode is selected according to the operation of the shift lever, the grouped special moving modes may be sequentially changed and selected. In addition, the special moving mode may include a diagonal moving mode, a parallel moving mode, and an in place rotating mode, and the D-stage mode may be directly connected to the (+) mode and the (−) mode in a branched form.

Through the above configuration, the present disclosure may provide the traveling mode and the special moving mode to be mechanically differentiated in preparation for the switching operation between the traveling modes or between the special moving modes upon switching between the traveling mode and the special moving mode, thereby arousing the driver's attention upon switching to the special moving mode to prevent the misoperation of the switching operation between the modes due to the driver's mistake. Further, by grouping various behaviors of the vehicle according to the actual driving pattern and the purpose of use, and disposing the components to allow the driver to intuitively select and switch each grouped mode, it may be possible to building the user-friendly interface even while simplifying the traveling mode switching operation.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplar)/processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1A:
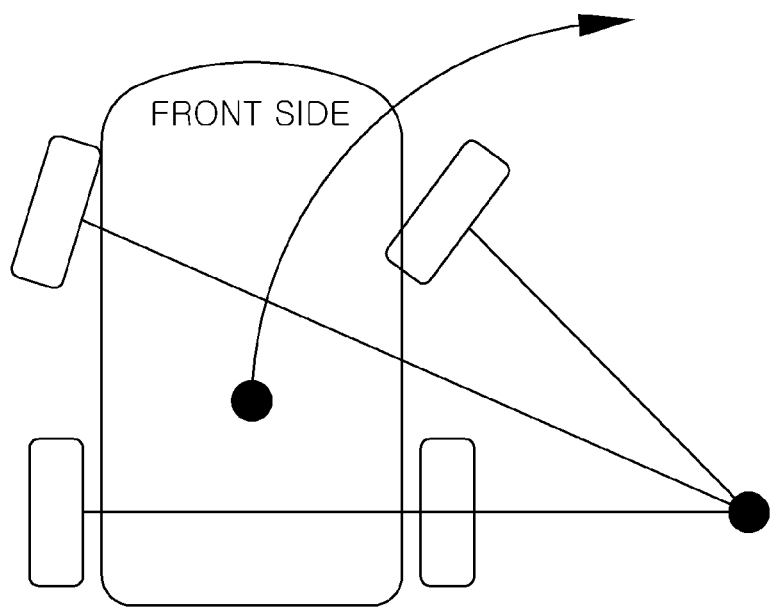
FIGS. 1A to 1E are diagrams for explaining steering rotations of a wheel and behaviors of a vehicle for each traveling mode of a four-wheel independent steering type vehicle according to the related art.
Figure 1B:
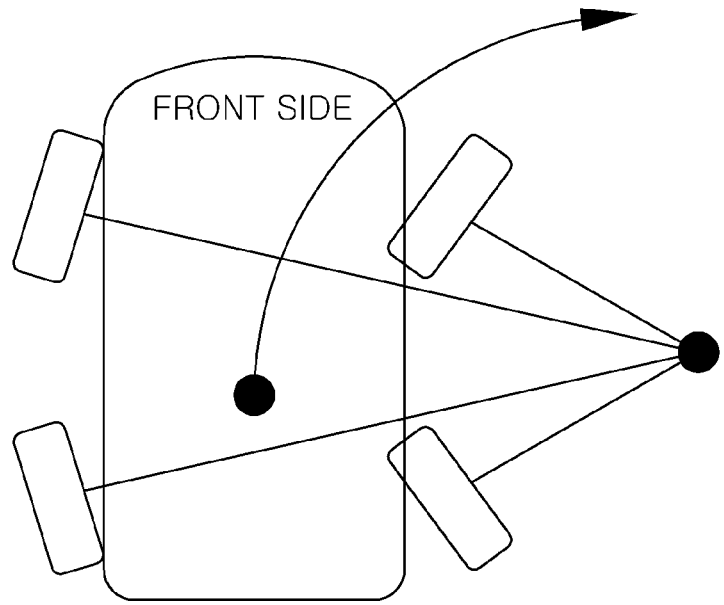
Figure 1C:
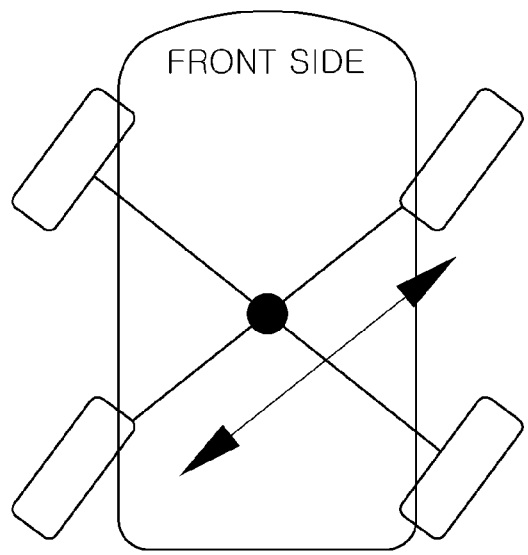
Figure 1D:
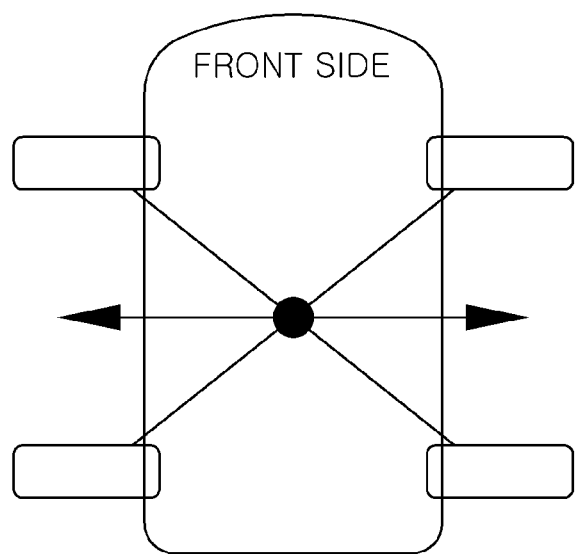
Figure 1E:
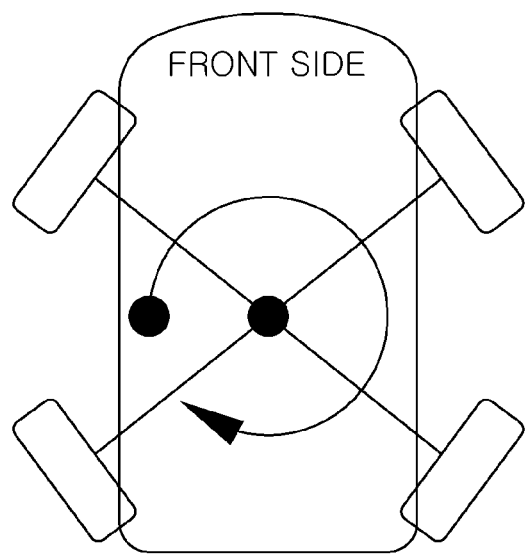
Figure 2:
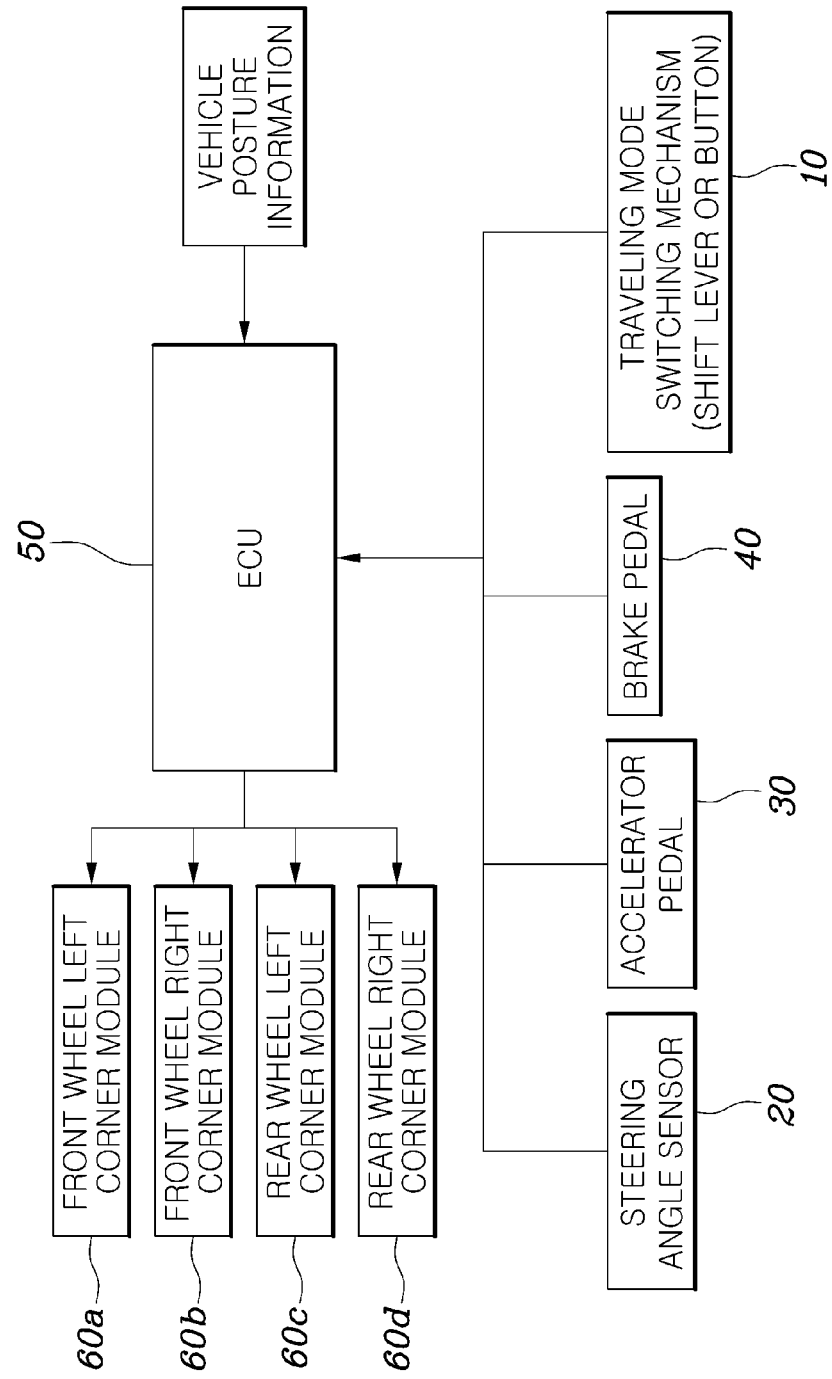
FIG. 2 is a block diagram of a traveling mode switching control system according to an exemplary embodiment of the present disclosure.

Exemplary embodiments of the present disclosure will be described in detail with reference to the accompanying drawings as follows. FIG. 2 is a block diagram of a four-wheel steering system using a traveling mode switching mechanism according to the present disclosure.

Describing a four-wheel steering system applicable to the present disclosure with reference to FIG. 2, the four-wheel steering system may include a traveling mode switching mechanism 10 (e.g., a shift lever or button), a steering wheel, an acceleration pedal 30, a brake pedal 40, an electronic control unit (ECU) 50 (e.g., a controller), and corner modules 60a, 60b, 60c, 60d in which an independent steering operation may be performed for each vehicle wheel. In particular, the four-wheel steering system may be configured to detect a steering angle using a steering angle sensor 20 connected to a steering wheel to transmit the detected steering angle to the controller 50. A mechanism configured to generate a steering reaction force may be selectively added.

The accelerator pedal 30 may be configured to detect a depressing signal using an accelerator pedal sensor (APS), and transmit the detected signal to the controller 50. The brake pedal 40 may be connected to a braking mechanism to operate the braking mechanism, and the brake pedal 40 may also be configured to detect a depressing signal using a brake pedal sensor (BPS), and transmit the detected signal to the controller 50.

The corner modules 60a, 60b, 60c, 60d may utilize existing corner modules, but large steering angle corner modules 60a, 60b, 60c, 60d, which are steered up to 90 degrees to one side, are suitable as the corner module to maximize the versatility of the four-wheel independent steering operations such as parallel parking and in place rotation. The large steering angle corner modules 60a, 60b, 60c, 60d may include a suspension device capable of fully striding the gap with the wheel, a fixed angle drive shaft or an in-wheel system, and a steering actuator configured to provide an operating force to steer the large steering angle corner modules 60a, 60b, 60c, 60d independently.

Meanwhile, the traveling mode switching mechanism according to the present disclosure may be implemented through a shift lever which is moved and operated within a shift gate, and may be implemented through a shift button in some cases. Describing a configuration of the traveling mode switching mechanism using the shift lever and the shift gate with reference to FIG. 3, first, the shift gate forms a moving path of the shift lever, may be disposed by grouping traveling modes including a park (P)-stage mode 110, a drive (D)-stage mode 120, and a reverse (R)-stage mode 130, and may be disposed by grouping a special moving mode excluding the P-stage mode 110, the D-stage mode 120, and the R-stage mode 130.

Particularly, the traveling mode switching mechanism may include a mode switching differentiation device configured to differentiate the mode switching operation of the driver by configuring so that the operation of the shift lever switched between the traveling mode and the special moving mode is physically different from the operation of the shift lever switched between the traveling modes or between the special moving modes. For example, a first group 100 may become a traveling mode including the P-stage mode 110, the D-stage mode 120, and the R-stage mode 130, and a second group 200 may become the special moving mode excluding the P-stage mode 110, the D-stage mode 120, and the R-stage mode 130, and thus, the first group 100 may be disposed in front of the shift gate, and the second group 200 may be disposed behind the shift gate.

In other words, upon switching between the traveling mode and the special moving mode, the traveling mode and the special moving mode may be mechanically differentiated in preparation for the switching operation between the traveling modes or between the special moving modes, thereby arousing the driver's attention upon switching to the special moving mode to prevent the switching operation misoperation due to driver error. Further, by grouping various behaviors of the vehicle according to the actual driving pattern and the purpose of use, and disposing the components so that the driver may intuitively select and switch each grouped mode, it may be possible to build a user-friendly interface even while simplifying the traveling mode switching operation.

Meanwhile, FIGS. 3 to 6 are diagrams illustrating forms of a first exemplary embodiment of the mode switching differentiation device (operated by the controller) according to the present disclosure for each type of the switching mechanism, and the mode switching differentiation device may be configured so that the operation stroke of the shift lever switched between the traveling mode and the special moving mode is longer than the operation stroke of the shift lever switched between the traveling modes or between the special moving modes. In particular, the traveling mode may include the P-stage mode 110 for parking the D-stage mode 120 for forward traveling, and the R-stage mode 130 for backward or reverse traveling, and the special moving mode may include a diagonal moving mode 210 for the diagonal forward movement, a parallel moving mode 220 for the left and right movement, an in place rotating mode 230 for turning in place, and a diagonal R-stage mode 240 for the diagonal backward or reverse movement.

Figure 3:
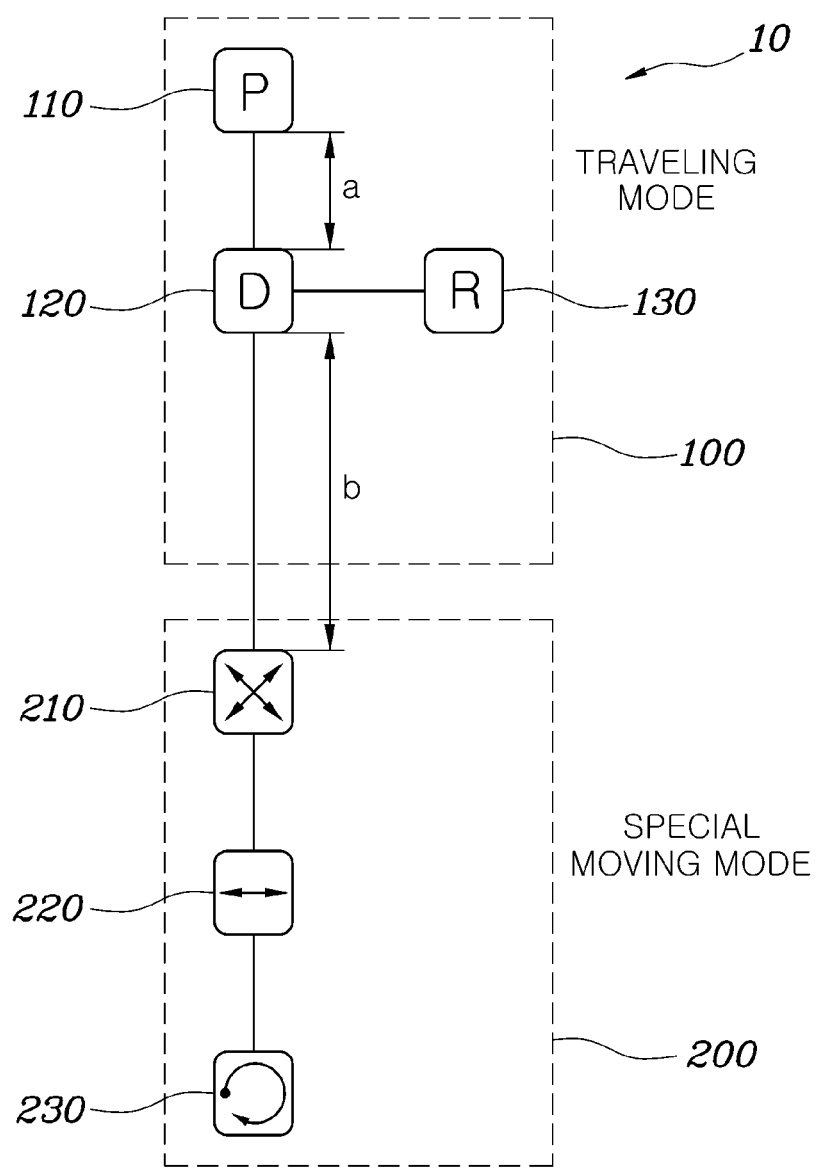
FIGS. 3 to 6 are diagrams illustrating forms of a first exemplary embodiment of a mode switching differentiation device according to the present disclosure for each type of a switching mechanism.
Figure 4:
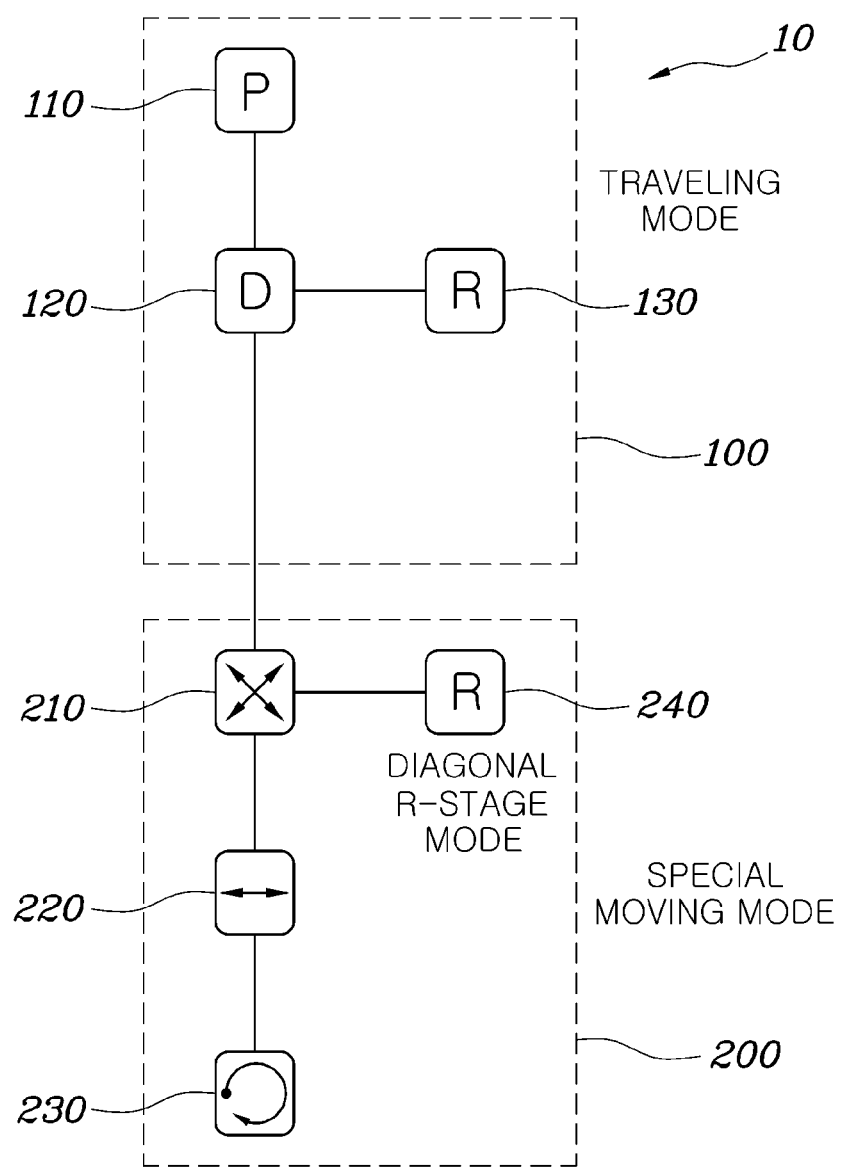

Particularly, FIG. 3 is a first switching mechanism type to which the diagonal R-stage mode 240 is not applied, and FIG. 4 is a second switching mechanism type to which the diagonal R-stage mode 240 is applied. For example, the operation stroke of the shift lever switched between the D-stage mode 120 and the diagonal moving mode 210 may be configured to be longer than the operation stroke of the shift lever switched between the traveling modes or between the special moving modes.

Figure 5:
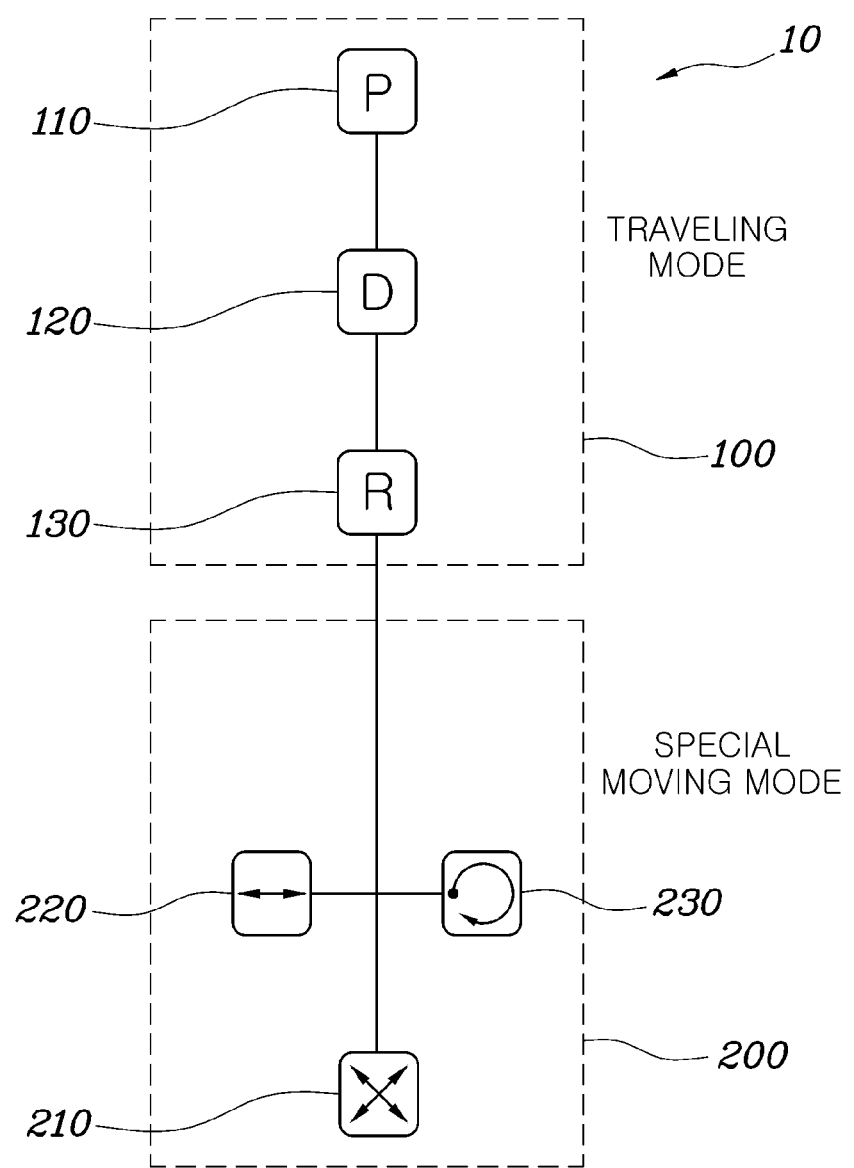
Figure 6:
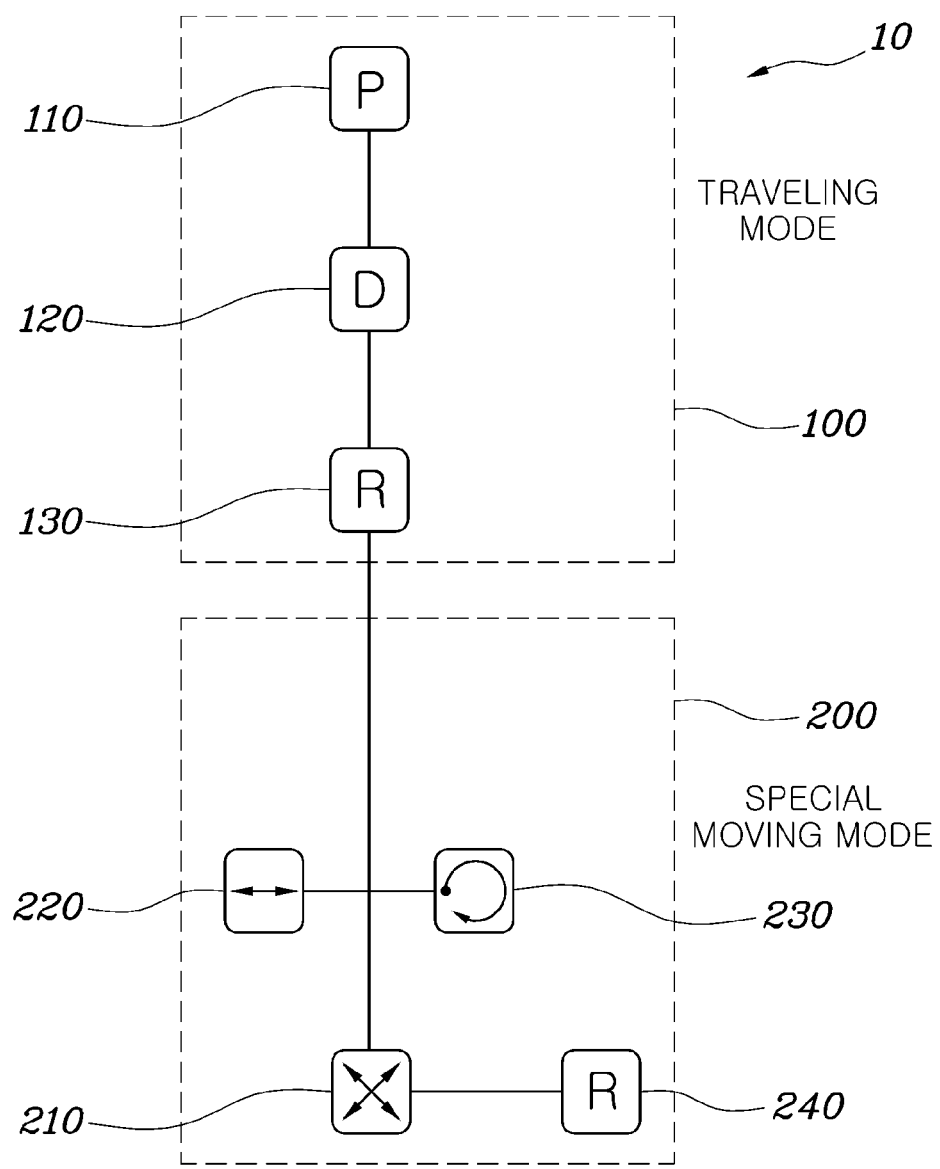

FIG. 5 is a third switching mechanism type to which the diagonal R-stage mode 240 is not applied, and FIG. 6 is a fourth switching mechanism type to which the diagonal R-stage mode 240 is applied. For example, the operation stroke of the shift lever switched between the R-stage mode 130 and the diagonal moving mode 210 may be configured to be longer than the operation stroke of the shift lever switched between the traveling modes or between the special moving modes. In other words, since the difference in the behaviors of the vehicle is excessive between the traveling mode and the special moving mode, it is necessary to prevent the mode switching misoperation of the driver by notifying the driver of the difference upon switching between the traveling mode and the special moving mode.

Accordingly, by disposing the distance between the traveling mode and the special moving mode to be physically far away, it may be possible to change the operation stroke of the shift lever, and accordingly, to prevent the traveling mode and the special moving mode from being switched by the driver operating the shift lever excessively and erroneously. For reference, an operation stroke (b) of the shift lever between the traveling mode and the special moving mode may be set as about three times that of an operation stroke (a) of the shift lever between the traveling modes or between the special moving modes.

Figure 7:
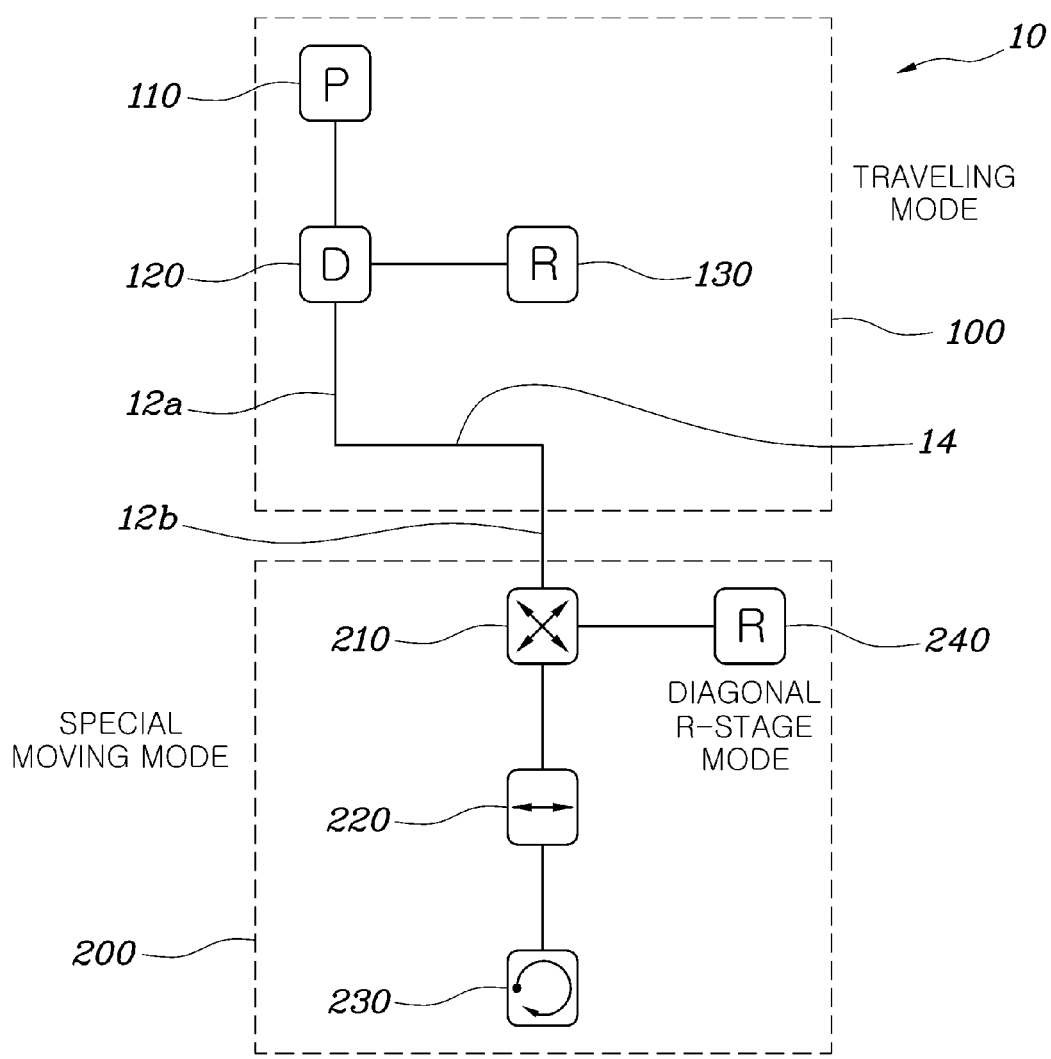
FIGS. 7 to 9 are diagrams illustrating forms of a second exemplary embodiment of the mode switching differentiation device according to the present disclosure for each type of a switching mechanism.
Figure 8:
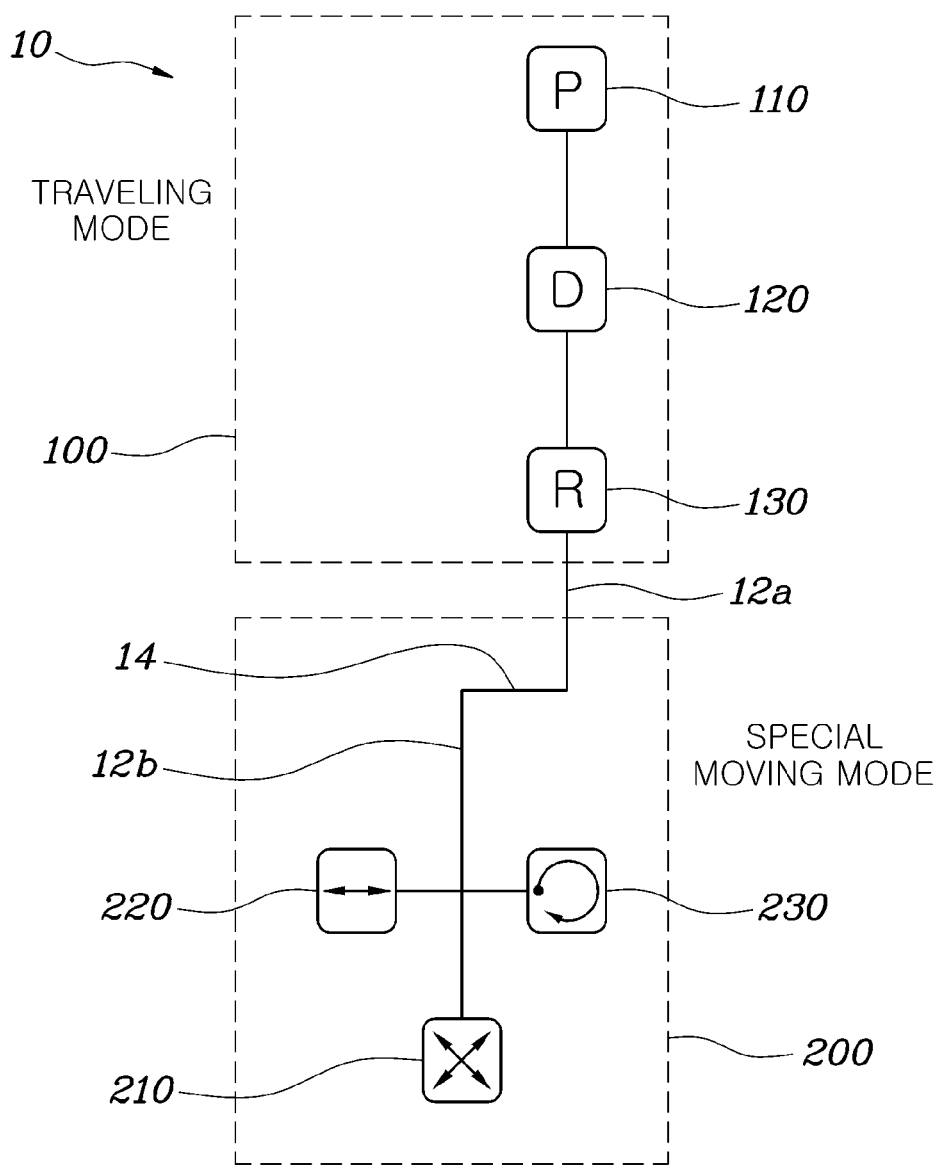
Figure 9:
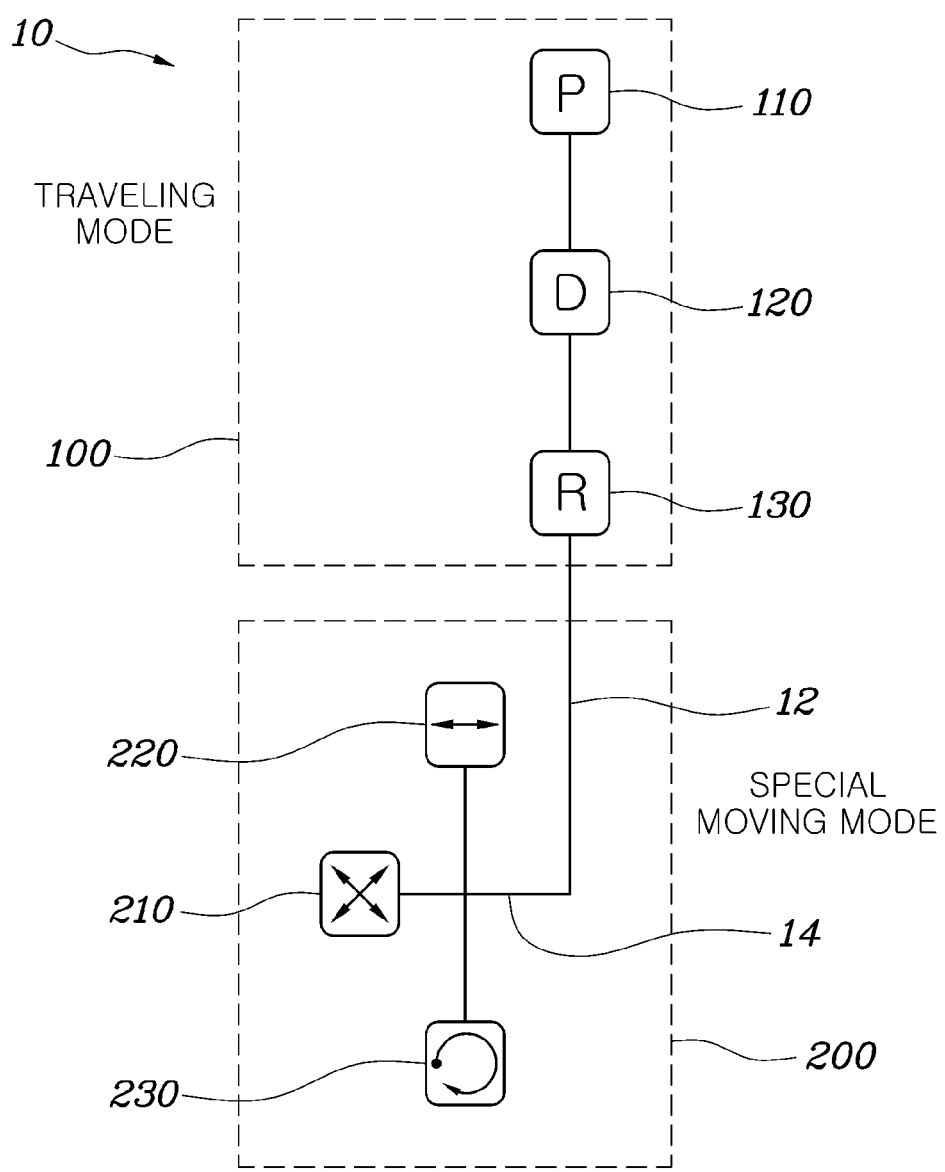

FIGS. 7 to 9 are diagrams illustrating forms of a second exemplary embodiment of the mode switching differentiation device according to the present disclosure for each type of the switching mechanism, and the mode switching differentiation device may be configured so that the operation direction of the shift lever switched between the traveling mode and the special moving mode is different from the operation direction of the shift lever switched between the traveling modes or between the special moving modes.

In other words, the shift lever may be operated in the left and right direction for the switching between the traveling mode and the special moving mode in the operation concept of the shift lever operated in the front and rear direction, thereby preventing the mode switching misoperation of the driver. Accordingly, the moving path of the shift lever switched between the traveling mode and the special moving mode may be formed by sequentially connecting a front-rear moving path 12 and a left-right moving path 14 of the shift lever.

Specifically, the switching mechanism type configuring the form of the second exemplar)/embodiment may include the front end of a first front-rear moving path 12a connected to the traveling mode, which is directly connected to the special moving mode, the rear end of a second front-rear moving path 12b connected to the special moving mode, which is directly connected to the traveling mode, and both ends of the left-right moving path 14 connected between the rear end of the first front-rear moving path 12a and the front end of the second front-rear moving path 12b.

For example, FIG. 7 illustrates a fifth switching mechanism type, and the front end of the first front-rear moving path 12a may be connected to the rear end of the D-stage mode 120, and the rear end of the second front-rear moving path 12b may be connected to the front end of the diagonal moving mode 210. Further, the left end of the left-right moving path 14 may be connected to the rear end of the first front-rear moving path 12a, and the right end of the left-right moving path 14 may be connected to the front end of the second front-rear moving paths 12b, thereby forming the moving path. As another example, FIG. 8 illustrates a sixth switching mechanism type, and the front end of the first front-rear moving path 12a may be connected to the rear end of the R-stage mode 130, and the rear end of the second front-rear moving path 12b may be connected to the front end of the diagonal moving mode 210. Further, the right end of the left-right moving path 14 may be connected to the rear end of the first front-rear moving path 12a, and the left end of the left-right moving path 14 may be connected to the front end of the second front-rear moving paths 12b, thereby forming the moving path.

Additionally, another type of the switching mechanism configuring the form of the second exemplary embodiment may include the front end of the front-rear moving path 12 connected to the traveling mode, which is directly connected to the special moving mode, a first side end of the left-right moving path 14 connected to the special moving mode, which is directly connected to the traveling mode, and a second side end of the left-right moving path 14 connected to the rear end of the front-rear moving path 12.

For example, FIG. 9 illustrates a seventh switching mechanism type, the front end of the front-rear moving path 12 may be connected to the rear end of the R-stage mode 130, the left end of the left-right moving path 14 may be connected to the right end of the diagonal moving mode 210, and the right end of the left-right moving path 14 may be connected to the rear end of the front-rear moving paths 12, thereby forming the moving path. In other words, when the driver operates the shift lever to move the shift lever backward, the shift lever may first be locked at the rear end of the front-rear moving path 12 allowing the driver to recognize that the vehicle is in a state which is switchable from the traveling mode to the special moving mode, thereby preventing the mode switching misoperation of the driver.

Meanwhile, referring to FIGS. 3 to 9, the special moving mode according to the present disclosure is a structure which may be disposed individually (e.g., separately) on the moving path of the shift lever. Referring to FIG. 3, the special moving mode may include the diagonal moving mode 210, the parallel moving mode 220, and the in place rotating mode 230, and the R-stage mode 130 may be directly connected to the side end of the D-stage mode 120, and the diagonal moving mode 210 may be directly connected to the rear end of the D-stage mode 120. For reference, the P-stage mode 110 may be connected to the front end of the D-stage mode 120.

Further, the special moving mode may include the parallel moving mode 220 directly connected to the rear end of the diagonal moving mode 210, and the in-place rotating mode 230 directly connected to the rear end of the parallel moving mode 220. As another example, referring to FIG. 5, the special moving mode may include the diagonal moving mode 210, the parallel moving mode 220, and the in place rotating mode 230, and the D-stage mode 120 may be directly connected to the front end of the R-stage mode 130, and the P-stage mode 110 may be connected to the front end of the D-stage mode 120.

In addition, the special moving mode may include the diagonal moving mode 210, the parallel moving mode 220, and the in place rotating mode 230 directly connected to the rear end of the R-stage mode 130 in a branched form. As illustrated in FIGS. 4, 6, and 7, the diagonal R-stage mode 240 may be directly connected to the diagonal moving mode 210. For example, the diagonal R-stage mode 240 may be connected to the side end of the diagonal moving mode 210, and thus, the shift lever may be operated to switch from the diagonal moving mode 210 to the diagonal R-stage mode 240, thereby moving the vehicle backward in the diagonal direction.

Figure 10:
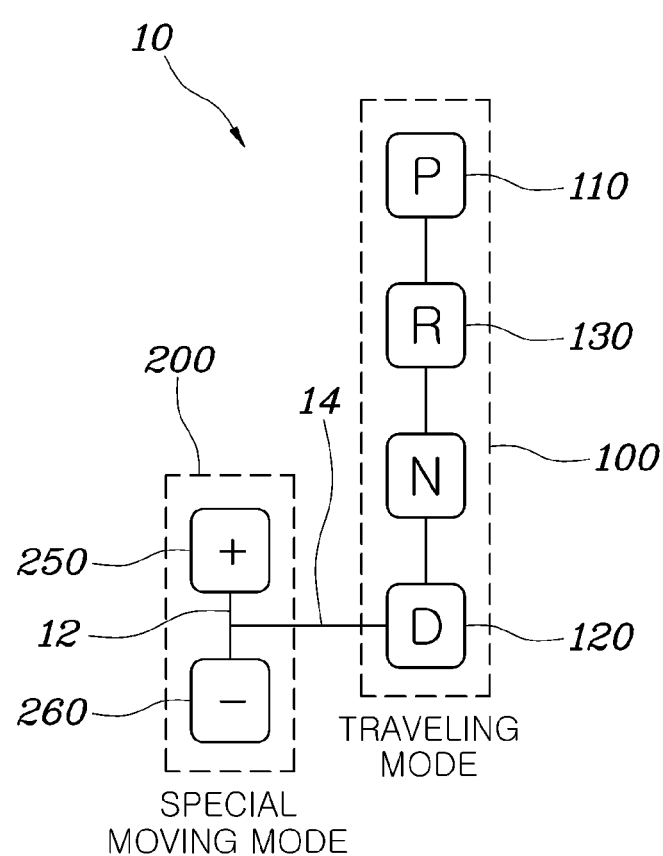
FIG. 10 is a diagram illustrating a switching mechanism which implements a form of a third exemplary embodiment of the mode switching differentiation device according to the present disclosure.

Meanwhile, FIG. 10 illustrates an eighth switching mechanism type configuring the form of a third exemplary embodiment of the mode switching differentiation device, and referring to FIG. 10, the eighth switching mechanism type may be configured with a first side end of the left-right moving path 14 connected to the traveling mode, a second side end of the left-right moving path 14 connected to the middle end of the front-rear moving path 12, and the front end and rear end of the front-rear moving path 12 connected to a special moving selection mode capable of selecting the special moving mode.

In particular, the special moving selection mode may include a (+) mode 250 and a (−) mode 260, and whenever the (+) mode 250 or the (−) mode 260 is selected according to the operation of the shift lever, the grouped special moving modes may be sequentially changed and selected. Further, the special moving mode may include the diagonal moving mode 210, the parallel moving mode 220, and the in place rotating mode 230, and the (+) mode 250 and the (−) mode 260 may be directly connected to the side end of the D-stage mode 120 in a branched form, and the P-stage mode 110, the R-stage mode 130, and a N-stage mode may be sequentially connected to the top end of the D-stage mode 120.

Accordingly, whenever the (+) mode 250 or the (−) mode 260 is selected, the diagonal moving mode 210, the parallel moving mode 220, the in-place rotating mode 230, and in some cases, the diagonal R-stage mode 240 may be sequentially changed and selected, and the thus selected special moving mode may be displayed on a cluster to allow the driver to recognize the currently selected special moving mode. In other words, the user interface of the switching mechanism may be strengthened by applying the existing interface as it is, and therefore, the (+) mode 250 and the (−) mode 260, which are the manual modes, may be configured to sequentially change the special moving mode rather than the gear shift while utilizing the shift gate of the existing P-R-N-D type, thereby implementing the user-friendly user interface.

As described above, the present disclosure is configured so that the traveling mode and the special moving mode are mechanically differentiated in preparation for the switching operation between the traveling modes or between the special moving modes upon switching between the traveling mode and the special moving mode, thereby arousing the driver's attention upon switching to the special moving mode to prevent the misoperation of the switching operation between the modes due to the driver error. Further, by grouping various behaviors of the vehicle according to the actual driving pattern and the purpose of use, and disposing the components so that the driver may intuitively select and switch each grouped mode, it may be possible to build a user-friendly interface even while simplifying the traveling mode switching operation.

Meanwhile, while the present disclosure has been described in detail only with respect to the aforementioned specific examples, it is apparent to those skilled in the art that various changes and modifications are possible within the technical spirit scope of the present disclosure, and it is natural that such changes and modifications fall within the appended claims.

What is claimed is:

1. A traveling mode switching mechanism of a four-wheel independent steering type vehicle, comprising:
   a shift gate disposed by forming a moving path of a shift lever, grouping a traveling mode including a park (P)-stage mode, a drive (D)-stage mode, and a reverse (R)-stage mode, and grouping a special moving mode excluding the P-stage mode, the D-stage mode, and the R-stage mode; and
   a mode switching differentiation device configured to differentiate a mode switching operation of a driver by configuring an operation of the shift lever switched between the traveling mode and the special moving mode physically different from an operation of the shift lever switched between the traveling modes or between the special moving modes.

2. The traveling mode switching mechanism of the four-wheel independent steering type vehicle according to claim 1, wherein the mode switching differentiation device is configured with an operation stroke of the shift lever switched between the traveling mode and the special moving mode that is longer than an operation stroke of the shift lever switched between the traveling modes or between the special moving modes.

3. The traveling mode switching mechanism of the four-wheel independent steering type vehicle according to claim 1, wherein the special moving mode is disposed individually on the moving path of the shift lever.

4. The traveling mode switching mechanism of the four-wheel independent steering type vehicle according to claim 1, wherein the mode switching differentiation device is configured with an operation direction of the shift lever switched between the traveling mode and the special moving mode different from an operation direction of the shift lever switched between the traveling modes or between the special moving modes.

5. The traveling mode switching mechanism of the four-wheel independent steering type vehicle according to claim 4, wherein the moving path of the shift lever switched between the traveling mode and the special moving mode is formed by sequentially connecting a front-rear moving path and a left-right moving path of the shift lever.

6. The traveling mode switching mechanism of the four-wheel independent steering type vehicle according to claim 5:
   wherein the front end of a first front-rear moving path is connected to the traveling mode, which is directly connected to the special moving mode,
   wherein the rear end of a second front-rear moving path is connected to the special moving mode, which is directly connected to the traveling mode, and
   wherein both ends of the left-right moving path are connected between the rear end of the first front-rear moving path and the front end of the second front-rear moving path.

7. The traveling mode switching mechanism of the four-wheel independent steering type vehicle according to claim 5:
   wherein the front end of the front-rear moving path is connected to the traveling mode, which is directly connected to the special moving mode,
   wherein a first side end of the left-right moving path is connected to the special moving mode, which is directly connected to the traveling mode, and
   wherein a second side end of the left-right moving path is connected to the rear end of the front-rear moving path.

8. The traveling mode switching mechanism of the four-wheel independent steering type vehicle according to claim 4:
   wherein a first side end of the left-right moving path is connected to the traveling mode,
   wherein a second side end of the left-right moving path is connected to the middle end of the front-rear moving path, and
   wherein the front end and the rear end of the front-rear moving path is connected to a special moving selection mode capable of selecting the special moving mode.

9. The traveling mode switching mechanism of the four-wheel independent steering type vehicle according to claim 8, wherein the special moving selection mode includes a (+) mode and a (−) mode, and each time the (+) mode or the (−) mode is selected according to the operation of the shift lever, the grouped special moving modes are sequentially changed and selected.

10. The traveling mode switching mechanism of the four-wheel independent steering type vehicle according to claim 9:
    wherein the special moving mode includes a diagonal moving mode, a parallel moving mode, and an in place rotating mode, and
    wherein the D-stage mode is directly connected to the (+) mode and the (−) mode in a branched form.

11. The traveling mode switching mechanism of the four-wheel independent steering type vehicle according to claim 1:
    wherein the special moving mode includes a diagonal moving mode, a parallel moving mode, and an in place rotating mode,
    wherein the D-stage mode is directly connected to the R-stage mode and the diagonal moving mode, respectively,
    wherein the diagonal moving mode is directly connected to the parallel moving mode, and
    wherein the parallel moving mode is directly connected to the in place rotating mode.

12. The traveling mode switching mechanism of the four-wheel independent steering type vehicle according to claim 11, wherein a diagonal R-stage mode is directly connected to the diagonal moving mode.

13. The traveling mode switching mechanism of the four-wheel independent steering type vehicle according to claim 1:
- wherein the special moving mode includes a diagonal moving mode, a parallel moving mode, and an in place rotating mode, and
- wherein the R-stage mode is directly connected to the D-stage mode, and the R-stage mode is directly connected to the diagonal moving mode, the parallel moving mode, and the in place rotating mode in a branched form.

14. The traveling mode switching mechanism of the four-wheel independent steering type vehicle according to claim 13, wherein a diagonal R-stage mode is directly connected to the diagonal moving mode.

\* \* \* \* \*